Patented Jan. 18, 1938

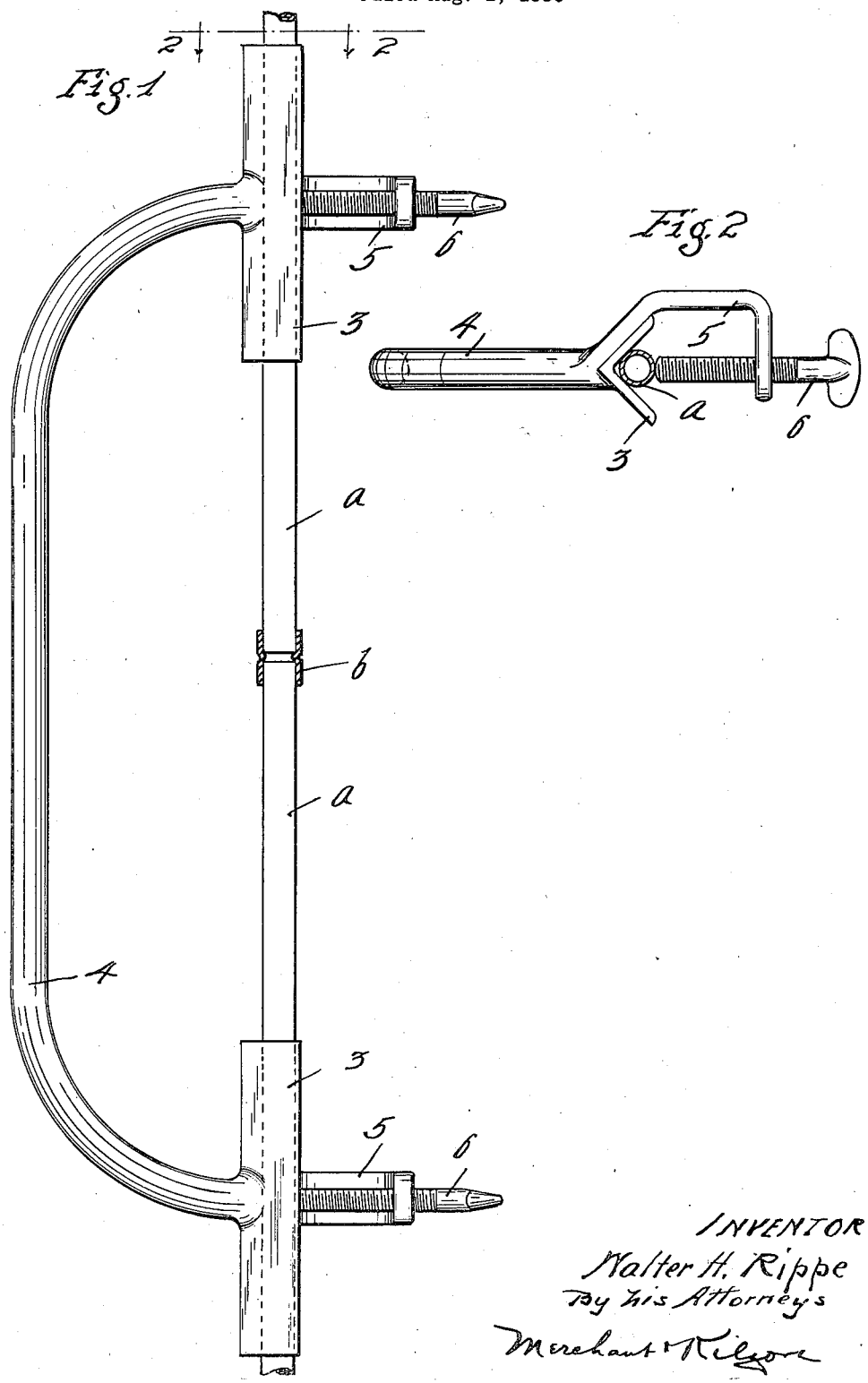

2,105,954

UNITED STATES PATENT OFFICE 2,105,954

PIPE ALIGNING TOOL

Walter H. Rippe, Hutchinson, Minn.

Application August 1, 1936, Serial No. 93,871

1 Claim. (Cl. 113—102)

My invention provides an extremely simple and highly efficient portable pipe aligning tool, and to such ends, generally stated, consists of the novel devices, combinations of devices and arrangement of parts hereinafter described and defined in the claim.

The improved tool is especially adapted for use by plumbers and others in connecting, in axial alignment, the ends of pipe sections; and for this purpose, the tool is useful in connecting pipes in an erected building or in connecting two portable or loose pipe sections.

These pipe sections at their abutting or adjacent ends are customarily connected by a coupling sleeve from which they are telescoped, and it is the common practice to permanently unite the pipe sections to the sleeve in true axial alignment and usually with gas and water-tight joints, for which latter purpose the sleeve is usually united by soldering, brazing or electric welding.

The improved tool is illustrated in the accompanying drawing wherein like characters indicate like parts throughout the several views.

Referring to the drawing:

Fig. 1 is a side elevation showing the improved pipe aligning tool in side elevation, views to align two pipe sections while they are being telescoped into and secured to the coupling sleeve, the coupling sleeve being indicated in section; and Fig. 2 is an end elevation of the device, one of the pipe sections being sectioned on the line 2—2 of Fig. 1.

The pipe sections are indicated by the character $a$, and the coupling sleeve by the character $b$.

The pipe sections are arranged to be placed in trough-like aligning channels 3, made V-shaped in cross-section and rigidly united by a laterally offset yoke 4, preferably formed integrally with the channels. At the terminals of the yoke 4 are L-shaped arms or lugs 5 that are offset in a direction opposite to the offset of the yoke 4 and in a direction away from the open channels 3. Clamping screws 6 work through the offset ends of the lugs and are so positioned that their inner ends are adapted to clamp the pipe sections against the diverging walls of the channels. The aligning channels 3 are, of course, in perfect alignment so that the two pipe sections, clamped one in each of the aligning channels, will be held in true alignment. When the clamping screws 6 are screwed down against the pipe sections, the pipe sections will not only be held in alignment but against axial movements properly telescoped into the coupling sleeve $b$ and thus properly held while the sleeve is being brazed, soldered or otherwise secured to the pipe sections.

In the application of solder, and especially in the brazing operation, a torch used to heat the sleeve will produce very considerable radiant heat, which if intensely active upon the means coupling the channels, would by expanding the yoke, throw the aligning channels out of true alignment. Hence, the yoke 4 is offset at a very considerable distance from the aligning channels where the effect of heat thereon will be negligible. When the device is out of use, the yoke affords a convenient carrying handle for the device, and when two loose pipe sections are clamped in alignment and are to be carried from one place to another while aligned, said yoke affords not only a convenient handle but means for maintaining channels, and hence, the pipe sections in alignment. The L-shaped lugs 5 form extensions of the ends of the yoke 4 so that the force transmitted from the clamping screw 6 through the lugs 5 will be carried directly to the yoke and will not tend to distort or rotate the aligning channels 3. These aligning channels are extended in both directions from the ends of the yoke and under this arrangement will hold their true alignment and not be shifted by the clamping actions of the screws.

In actual practice, the device described has been found highly efficient for the purposes had in view. It may be made at a small cost, either from cast metal or it may be a welded metal structure.

What I claim is:

A portable pipe aligning tool comprising a single rod the end portions of which are bent laterally on the same side of said rod, a pair of aligning channels on the ends of the rod and rigidly secured thereto, said channels being endwise spaced and aligned the one with the other, a pair of arms rigidly secured to the rod with their free end portions overlying the aligning channels and spaced therefrom, said aligning channels having one of their sides rigidly secured to the arms, and a pair of clamping screws having threaded engagement with the arms for movement toward or from the aligning channels.

WALTER H. RIPPE.